United States Patent [19]

Deviney

[11] Patent Number: 5,000,808
[45] Date of Patent: Mar. 19, 1991

[54] APPLICATION OF CONTINUOUS STRAND MATERIAL TO PLANAR SUBSTRATES

[76] Inventor: George L. Deviney, Rte. 2 Box 809, Forest City, N.C. 28043

[21] Appl. No.: 194,085

[22] Filed: May 13, 1988

[51] Int. Cl.$^5$ ............................................. B32B 5/08
[52] U.S. Cl. ..................................... 156/178; 156/63; 156/71; 156/176; 156/216; 156/250; 156/270; 156/302; 156/303; 52/311; 52/314; 52/DIG. 7; 428/105; 428/114; 428/542.6
[58] Field of Search ............... 156/178, 177, 176, 166, 156/436, 439, 440, 161, 302, 303, 216, 227, 250, 270, 344, 200, 202, 433, 434, 552, 522, 63, 71; 52/DIG. 7, 311, 314; 428/294, 105, 114, 542.2, 542.6

[56] References Cited

U.S. PATENT DOCUMENTS

| | | | |
|---|---|---|---|
| 178,949 | 6/1876 | Penley | 428/294 X |
| 2,246,776 | 6/1941 | Appleman | 28/22 |
| 2,422,969 | 6/1947 | Johns | 428/294 |
| 2,428,325 | 9/1947 | Collins | 428/294 |
| 2,429,235 | 10/1947 | Miskelly et al. | 428/294 X |
| 2,772,718 | 12/1956 | Magnuson | 156/177 X |
| 3,008,861 | 11/1961 | Rees et al. | 156/270 X |
| 3,053,717 | 9/1962 | Bright | 156/177 X |
| 3,230,995 | 1/1966 | Shannon | 156/166 |
| 3,265,548 | 8/1966 | Harkins, Jr. et al. | 156/79 |
| 3,367,821 | 2/1968 | Keyt et al. | 156/250 |
| 3,447,987 | 6/1969 | Williams | 156/227 X |
| 3,523,844 | 8/1970 | Crimmins et al. | 156/177 X |
| 3,576,705 | 4/1971 | Goldsworthy | 161/143 |
| 3,607,562 | 9/1971 | Brenneman et al. | 156/439 |
| 3,640,797 | 2/1972 | Taguchi et al. | 428/114 X |
| 3,684,645 | 8/1972 | Temple et al. | 161/141 |
| 4,094,944 | 6/1978 | Paetz | 264/137 |
| 4,277,527 | 7/1981 | Duhl | 428/109 |
| 4,303,716 | 12/1981 | Eshbach et al. | 428/188 |
| 4,473,605 | 9/1984 | Rausch | 52/311 X |

Primary Examiner—Michael W. Ball
Assistant Examiner—Jeff H. Aftergut
Attorney, Agent, or Firm—Dority & Manning

[57] ABSTRACT

A fiber wallboard, or similar rigid or non-rigid substrate, is directed via a conveyor through a roll coater for providing an adhesive layer on one side of the substrate. Packages of continuous strands, such as textile yarns, are supported on a yarn creel, and drawn through expansion combs and underneath a nip roll for being press rolled into the adhesive coating layer. The pattern of lateral yarn separation established with the expansion combs creates a particular design on the finished face of the substrate, and may be varied. The substrate with applied strands is dried and trimmed. Marginal edge yarns are particularly located relative the substrate edges so that yarn gaps surround seams between adjacent panel substrates. Seaming tape with additional textile yarns supported thereon may be fitted in the gaps to hide such seams. The panel substrates may be nailed, glued, or otherwise situated in a wall of such panels, with their common seams hidden by the seaming tape, to provide a prefinished wall having decorative textile yarn covering.

4 Claims, 5 Drawing Sheets

APPLICATION OF CONTINUOUS STRAND MATERIAL TO PLANAR SUBSTRATES

BACKGROUND OF THE INVENTION

The present invention concerns in general the application of continuous strand material to planar substrates, and concerns in particular related method, apparatus, and finished panels all relating to application of decorative strand material such as continuous textile yarns to panels for providing panels with prefinished surfaces.

In many construction techniques, it is often typical to first erect a wall, and then decorate such wall, for example with paint, wallpaper, or some other form of wall covering. The appearance of the finished wall in large measure depends on the nature and quality of the wall covering. For example, wallpaper may vary from a relatively inexpensive paper or vinyl based product, to textured wallpaper products, to layered products having relatively heavy-gauge substrates with grass cloth weave patterns or the like on their face surface.

Often times, a newly erected wall must be prepared before wall treatments can be applied. For example, walls of sheetrock must be spackled and sanded before any paint or wallpaper may be applied. Thus, in general, time savings may be obtained at construction sites (for either new construction or renovation) if a prefinished surface is provided on wall material, such as panelling, plywood, or fiber wallboard.

A variety of products generally having prefinished face surfaces are available to the building trade. Examples of such products include fiberboard with wallpaper preattached; masonite with vinyl wall covering prebonded; and free standing fiberglass cores with fabric covering on both sides. Other free standing products include honeycombed walls with wall coverings on both sides.

In general, wall coverings which incorporate textile yarn surfaces are both known, and very desireable, for their many decorative and practical qualities. On the decorative side, textile yarns lend warmth and beauty, offering a variety of colors. On the practical side, textile yarns provide good insulation (thermal insulation) and sound insulation or absorbency.

Construction panels having prefinished surfaces can have aesthetic drawbacks due to obvious or apparent seams between adjacent panels, caused by interruption of their respective decorative coverings. If wall coverings are applied to erected wall surfaces, typically seams in the wall coverings (such as seams between adjacent sheets of wallpaper) are not coextensive with seams in the wall panels, and are thus not a problem. Wall seams may be otherwise hidden (such as with spackling and sanding, mentioned above). However, some wall coverings are more difficult to apply to erected walls than others. For example, heavier gauge wallpaper having a grass cloth face surface may be more difficult to hang than lighter weight pre-pasted vinyl wall coverings. Other wall coverings, such as a plurality of respective continuous textile yarns, may be even more difficult to apply to existing or newly erected walls.

SUMMARY OF THE INVENTION

In general, the present invention recognizes and addresses such aspects, and others, of providing prefinished walls. Therefore, one of the broader present objects is to provide improvement in the area of prefinished walls. It is a more particular object to provide an improved method and apparatus for providing panels for use in the construction of prefinished walls.

It is another general object of this invention to provide improved construction panels, adapted for use in the construction of such prefinished walls.

In connection with the foregoing objects, it is yet another object of this invention to provide improved method and apparatus for applying continuous strand material to planar substrates, which substrates may in turn be used in various construction settings, without degradation of their decorative or aesthetic appeal. It is a more particular object to provide such an improved pre-decorated substrate which is useful in either new construction or renovation settings.

It is yet another object of this invention to provide construction panels which have prefinished surfaces advantageously making use of a plurality of respective continuous strands, such as textile yarns. Still another object is to practically laminate textile yarn to standard construction panels, such as four feet by eight feet wallboard. It is another object to provide such panels, with coverings on both sides thereof for use as free-standing office partitions or the like.

In addition to providing improved method and apparatus which renders practical prefinished panels incorporating continuous strand material such as respective textile yarns, it is an object to provide prefinished panels which may be joined at their respective seams in such manner as to obtain appearance advantages gained with the application of wall coverings to existing walls. Accordingly, further aspects of this invention concern seaming tape or the like which supports respective strands such as textile yarns thereon, for covering seams between adjacent construction panels while visually blending with strand material otherwise supported on such construction panels.

It is a further object to provide construction panels with prefinished surfaces incorporating textile yarns in selected pattern and/or color schemes, situated generally in either horizontal or vertical orientations.

It is still another object to provide for an improved construction panel which may be alternatively used in new construction settings, or nailed, glued, or otherwise applied over existing walls to be renovated, without requiring the patching of holes or the like in such existing walls.

The present invention concerns both method and apparatus for providing improved prefinished panels as mentioned above, and the resulting improved construction panels themselves. Various embodiments of the present invention (inclusive of the method, apparatus, and product thereof) may incorporate different combinations of presently disclosed features.

One exemplary embodiment of this invention concerns a method of applying continuous strand material to planar substrates, such method comprising: conveying a planar substrate in a given direction along a predetermined pathway, with a given planar surface of such substrate presented in a pathway application area for application of strand material thereto; providing a plurality of continuous strands to be respectively applied to such given planar surface in the pathway application area; applying an adhesive coating to the given planar surface before conveying same through the pathway application area; continuously drawing the strands across such given planar surface as such surface passes through the pathway application area, so as to contact the strands with the adhesive coating of such surface while applying pressure thereto; drying the adhesive coating so as to secure the strands to the planar surface; and trimming excess strand material extending beyond the planar surface; whereby a planar substrate is provided with decorative strand material for use in construction of prefinished walls.

An exemplary apparatus in accordance with this invention concerns an apparatus for applying continuous strand material to planar substrates, corresponding to the foregoing method.

Yet another exemplary embodiment in accordance with the present invention concerns a process for laminating a given substrate with textile yarn to provide decorative, prefinished panels, such process including providing a conveyor for advancing generally planar panels in a given direction along the axis of such conveyor, with a given side of such panels facing generally upwardly; providing a rotatable nip roll, with the rotation axis thereof generally perpendicular to the conveyor axis, and with the outside diameter thereof relatively adjacent panel given sides as they are advanced by such conveyor passed the nip roll; providing a yarn guiding comb situated generally above the conveyor, and upstream from the nip roll; coating with adhesive the given side of panels advanced by the conveyor, in an area generally upstream from the nip roll; drawing a plurality of yarn ends through the yarn guiding comb and underneath the nip roll, while advancing panels therebeneath with the conveyor, so that the nip roll pressures such yarn into contact with the adhesive coating for adherence of the yarn to the panel given sides; drying the adhesive coating in an area generally downstream from the nip roll, so as to generally secure such yarns to such panel sides; and cutting yarn extending between adjacent panels advanced under the nip roll with the conveyor, whereby individual prefinished panels are provided with yarn laminated to a given side thereof for decoration.

Yet another exemplary apparatus in accordance with the present invention includes an apparatus for laminating a given substrate with textile yarn to provide decorative, prefinished panels, such apparatus generally corresponding with the foregoing process for same.

Yet another exemplary embodiment of this invention concerns a production line for continuously making construction panels, each having a decorative, prefinished surface for use in constructing prefinished walls, such production line comprising a longitudinal conveyor having an input end and an output end, for conveying panel substrates therealong from the input end towards the output end thereof, with a given planar surface of each panel substrate generally facing upwardly, the conveyor input end being generally unrestricted for freely receiving panel substrates to be advanced along the conveyor with intervals therebetween; a yarn creel, adjacent the conveyor input end and supporting a plurality of textile yarn cones thereon for free feeding therefrom of respective continuous yarns wound about the cones; an adhesive roll coater, situated generally above the conveyor and downstream from the input area thereof, for applying an adhesive coating to upwardly facing given planar surfaces of panel substrates consecutively passing therebeneath conveyed by the conveyor; a nip roll, rotatably supported generally above the conveyor and downstream from the adhesive roll coater such that the outside diameter of the nip roll is generally contiguous with coated planar surfaces of panel substrates passed therebeneath by the conveyor; a plurality of yarn expansion combs, situated along and above the conveyor at spaced intervals between the yarn creel and the nip roll, with the most downstream of the combs being situated relatively adjacent the nip roll, such combs having the respective continuous textile yarns from the cones supported on the creel threaded therethrough for presentment of such yarns to the nip roll in predetermined patterns of lateral yarn spacing; a pair of marginal edge yarn guide eyes, situated near respective, opposite marginal edges of the conveyor between the nip roll and the comb closest thereto, for guiding the respective yarns closest to such marginal edges for presentment thereof to specific positions along and distances from respective marginal edges of each panel substrate, regardless of the yarn lateral spacing presentment pattern otherwise established with the combs; dryer means, situated along the conveyor downstream from the nip roll, for curing adhesive coatings passed thereby; and cutter means, situated along the conveyor downstream from the nip roll, for cutting textile yarns extending across the interval between adjacent consecutive panel substrates; wherein respective textile yarns may be fed from the yarn creel, through the expansion combs, and underneath the nip roll, for being press rolled into the adhesive layer by the nip roll in predetermined decorative patterns, and cured in such patterns by the dryer means, for forming a prefinished surface on the panel substrate having exposed marginal edges for application of yarn-covered seaming tape therein to effectively hide seams between adjacent marginal edges of such construction panels situated in a wall.

Still further aspects of the present invention concern exemplary embodiments thereof relative a construction panel having at least one prefinished planar side, one exemplary such construction panel comprising a planar, generally rectangular substrate, having at least one planar support surface; an adhesive layer supported on the planar support surface, for releasably supporting textile yarn thereon; and a plurality of generally parallel, respective textile yarns of selected type and color releasably supported on the adhesive layer with predetermined lateral spacing among such yarns for forming a selected, decorative pattern therewith on the planar support surface, wherein respective marginal edge yarns of such textile yarns are laterally spaced a predetermined distance from respective marginal edges of the planar support surface so as to form a predetermined marginal gap in yarn coverage on the planar surface along such edges, whereby a predetermined width seaming tape supporting yarns thereon may be applied for commonly covering contiguous marginal gaps of adjacent of such construction panels for hiding seams therebetween, with the tape-supported yarns visually blending in with the planar surface textile yarns.

Those of ordinary skill in the art will appreciate various modifications and variations which may be practiced in connection with the presently disclosed methods, processes, apparatus, production lines, and construction panels, without departing from the spirit and scope of the present invention. All such modifications and variations are intended to be included aspects of this invention, by virtue of present reference thereto.

BRIEF DESCRIPTION OF THE DRAWINGS

A full and enabling disclosure of the present invention, including the best mode thereof, is set forth in the present specification, which further makes reference to the accompanying drawings, in which.

Figure 1:
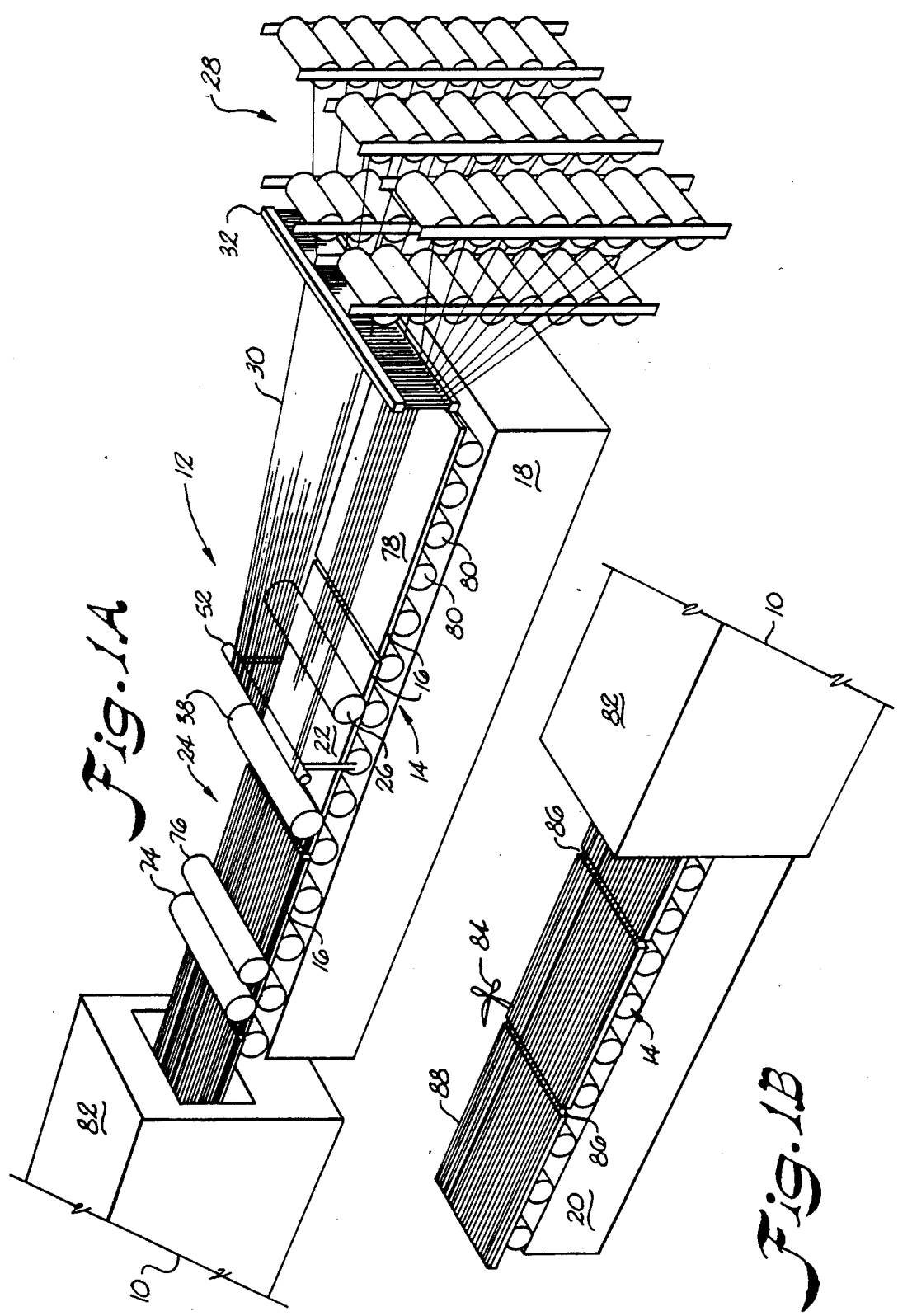
FIGS. 1A and 1B (collectively comprising FIG. 1) illustrate a perspective view of a production line in accordance with the present invention.

Repeat use of reference characters throughout the present specification and drawings is intended to represent same or analogous features or aspects of this invention.

DETAILED DESCRIPTION OF THE PREFERRED EMBODIMENTS

The present invention concerns both method and apparatus for producing panel substrates with prefinished surfaces, and concerns as well the resulting substrate products. Those of ordinary skill in the art will appreciate that the following description, while from time to time expressly discussing either a method or apparatus, at all times equally concerns the corresponding (though possibly not expressly mentioned) method or apparatus. Furthermore, while the following discussion of FIGS. 1-11 relates to specific details as illustrated concerning such exemplary embodiments of this invention, the invention itself is not limited to such specific details, but more broadly includes aspects thereof as discussed throughout this specification.

Figure 2:
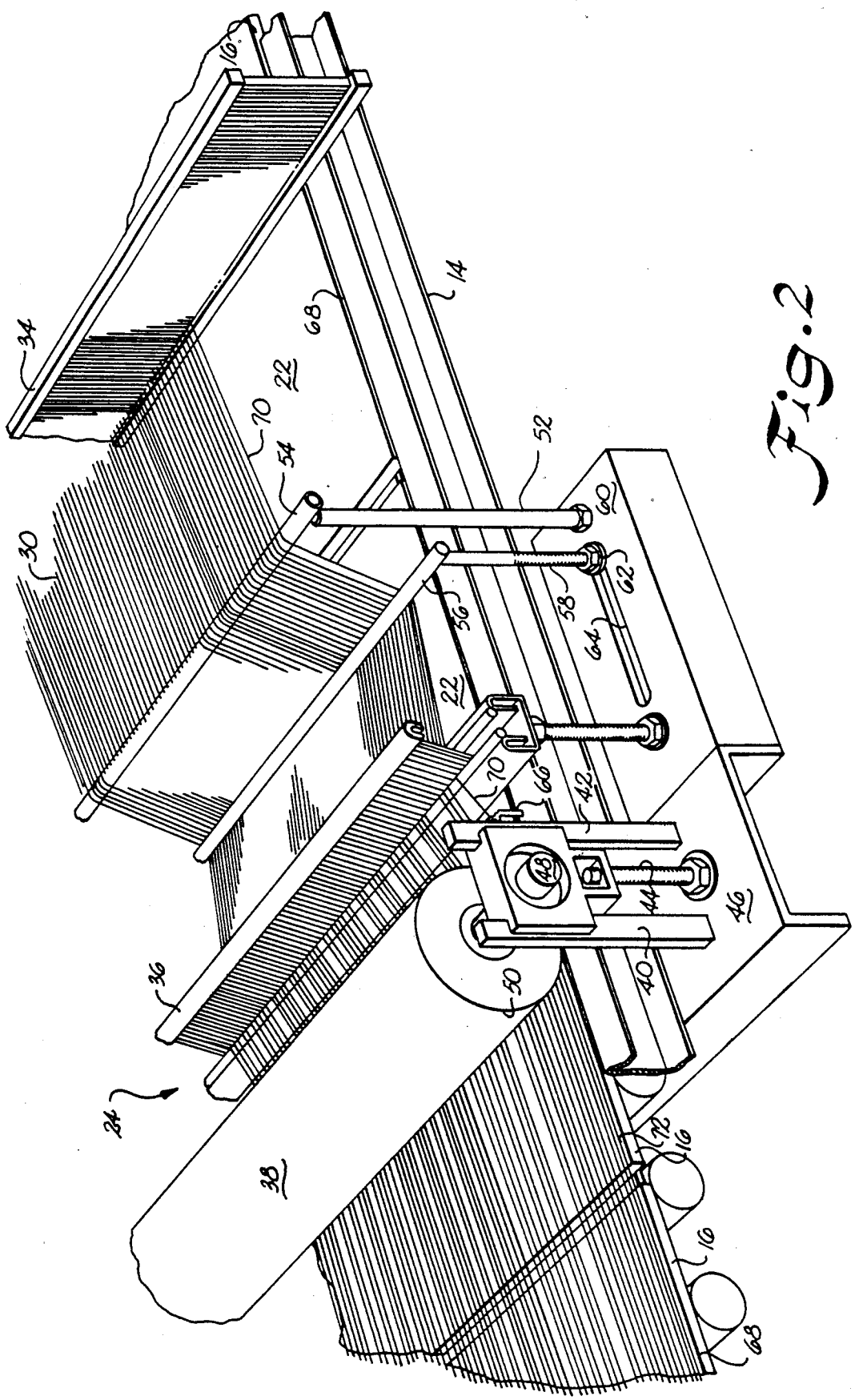
FIG. 2 illustrates enlarged detail of a portion of the production line in FIG. 1, particularly concerning the area of such production line where a plurality of respective continuous strands are applied to a planar substrate.

FIGS. 1 and 2 illustrate exemplary apparatus, practiced in accordance with present method or process features, for producing panel substrates in accordance with this invention. More particularly, such figures illustrate a production line for applying continuous strand material to planar substrates. FIG. 1 comprises component parts FIGS. 1A and 1B, which for ease of illustration only, are interrupted along line 10. Those of ordinary skill in the art will appreciate that the FIG. 1 composite view is formed by joining components 1A and 1B along such line 10. FIG. 2 illustrates enlarged detail of a portion of the FIG. 1 embodiment, and is discussed hereinbelow in connection with such FIG. 1 embodiment.

With reference to such figures, a production line 12 is illustrated for the preferably continuous application of continuous strand material to planar substrates for the production of construction panels having a prefinished surface. A longitudinal conveyor means 14 conveys planar substrates 16 generally in a given direction along the longitudinal axis of such conveyor. The substrates are advanced from an input end 18 of such conveyor towards an output end 20 thereof, preferably with a given planar surface 22 of each substrate directed generally upwardly for the application of continuous strand material thereto in an application area 24 of conveyor means 14. In general, FIG. 2 illustrates enlarged detail of such application area 24, and other features of production line 12 relatively adjacent thereto.

In accordance with this invention, an adhesive coating is applied to each given planar surface 22 of planar substrates 16 as they are consecutively conveyed along a predetermined pathway formed with conveyor means 14. A conventional adhesive roll coater 26 or equivalents thereof may be used for evenly applying a layer of conventional construction pastes, glues, or the like to surfaces 22. Alternatively, such adhesive coating may be manually applied, such as with a brush or the like, or otherwise deposited on each surface 22 prior to placement of substrate 16 into the generally unrestricted area adjacent input end 18 of conveyor means 16.

A creel 28, or some structure such as a loom beam, is used to support and supply a plurality of continuous strands 30 to be respectively contacted with such adhesive coating for securement to surfaces 22 of each panel substrate 16. Creel 28 or the like supports a plurality of packages or cones of strand material, such as yarns. The end of each yarn is freely fed from its respective package or cone through guide means towards area 24 where they are applied to the planar substrates. Such guide means may comprise comb means 32 situated generally between creel 28 and application area 24. Preferably, such comb means comprise a plurality of expansion combs 34 and 36 situated at spaced intervals along conveyor means 16, between the input end and application area, as discussed above.

Conventional expansion combs, as known to those of ordinary skill in the art, include a plurality of teeth or the like, for guiding individual continuous strands therethrough in a predetermined pattern formed by the established lateral separation between such strands. Thus, by selecting the pattern established with such comb means, the pattern of strands as applied to planar substrates 16 may be controlled for selected decoration thereof. Predetermination of such decoration may be completed by selective use of strands, such as textile yarns, of particular colors and types.

Moreover, further in accordance with the present invention, variable expansion combs as known to those of ordinary skill in the art may be used for changing the predetermined pattern of yarn lateral separation, even during the course of applying such yarns to particular panel substrates, whereby further variation may be obtained in the preparation of prefinished surfaces of such panels.

Application of the plurality of respective strands 30 to surface 22 of each substrate 16 is conducted with a contact means, such as a nip roll 38. Continuous yarns are guided between the rotatably mounted nip roll 38 and surfaces 22 as substrates 16 are conveyed underneath such nip roll. By being directed therebetween, the yarns are pressed by nip roll 38 into the adhesive surface 22 for decorating such surface.

The amount of pressure with which such contacting of yarns to surface is conducted may be varied in accordance with the present invention. FIG. 2 illustrates one end of nip roll 38, which is movably mounted relative upright support members 40 and 42. By adjusting threaded member 44 relative its support base 46, one end of rotational axis 48 of nip roll 38 may be adjusted relative conveyor means 14. A similar arrangement used on the opposite end of rotational axis 48 (not shown) permits the outside diameter 50 of nip roll 38 to be positioned relative given planar surfaces 22 as they are passed consecutively therebeneath for selecting the amount of pressure with which strands 30 are contacted with such surface. In addition to such adjustable pressure, the weight of nip roll 38 also contributes to the pressure which roll presses the respective continuous yarns into the adhesive coating on surface 22.

In addition to such pressure control, the tension on such respective strands is also controlled. Tensioning means 52 (see FIG. 2) may include various structures for controllably establishing the amount of tension on the respective strands 30. In general, the tension is controlled to adequately maintain relatively straight travel of the strands.

In the preferred embodiment of present FIG. 2, such tensioning means includes a pair of displaced parallel members (rods) 54 and 56, which establish a tensioned pathway for strands 30. In general, the degree to which such strands 30 are deflected from a straight path as they travel from creel 28 (or any other yarn supply structure) towards nip roll 38, establishes the amount of tension in such respective strands. Thus, changes in the relative position of members 54 and 56 is one preferred way of adjusting such tension. Each end of rod 56, for example may be adjustably positioned. Threaded member 58 may be raised or lowered relative its base support 60 (in cooperation with nut and washer arrangement 62), or member 58 may be longitudinally positioned at various points along the axis of conveyor 14 in channel 64 formed within support member 62. Similar structure may be provided on the opposite end of rod 56 (not illustrated).

In addition to the foregoing pressure and tension control of respective strands 30, and the selection of predetermined yarn lateral separation patterns, respective marginal edge yarns may be separately guided so as to be positioned a predetermined distance from the respective marginal edges of surfaces 22 of each panel substrate 16. For example, marginal edge yarn guide eye 66 (see FIG. 2) may be situated adjacent the corresponding marginal edge 68 of planar surface 22, and intermediate nip roll 38 and the closest expansion comb thereto (comb 36). Guide eye 66 receives the marginal edge yarn 70 of its respective side therein, for guiding same into a particular position beneath nip roll 38, whereby such marginal edge yarn 70 becomes secured to surface 22 along the marginal edge 68 thereof, at a predetermined distance therefrom. In such fashion, a predetermined yarn gap 72 (i.e., in which no yarns are present) is established on surface 22 along the marginal edge thereof, regardless of the predetermined yarn lateral separation pattern established with comb 36 for the remainder of strands 30 situated on such surface 22. The opposite marginal edge yarn (not shown) is likewise situated by another eye guide (also not shown), for establishing a like marginal edge gap on the opposite respective marginal edge of surface 22. Advantages of such marginal gaps are explained below.

In addition to the weight and controlled pressure of nip roll 38, further press rolls 74 and 76 (see FIG. 1A) may be situated relatively downstream from nip roll 38. Such press rolls may additionally be driven, as nip roll 38 may optionally be, for assisting with the advancement of planar substrates 16 along conveyor means 14. While conveyor means 14 may assume virtually any form of practical device, preferably it includes a conveyor belt 78 or similar structure advanced along in a given direction towards output end 20 thereof by a plurality of rotatable support members 80, bearings, or their functional equivalents. The width of conveyor belt 78 may be varied, but preferably is about the same width as planar substrates to be conveyed thereby.

In addition to the foregoing drive features, additional drive rolls may be utilized in connection with directing strands 30 towards nip roll 38. Such drive rolls (not shown) may be included in the area of the strand pathway which exists between comb means 32 and tensioning means 52, and may include a pair of opposing rolls on either side of strands 30 for grasping same, while rotating in such a direction as to advance continuous strands 30 towards nip roll 38.

Further in accordance with the present invention, after the plurality of respective continuous strands or textile yarns 30 are press rolled into the adhesive coating on surface 22 of planar substrates 16 (which adhesive coating is preferably in a somewhat tacky state at such time of contact), drying of the adhesive coating is effected so as to secure strands 30 to the planar substrate. Various dryer means may be provided. For example, nip roll 38 may be heated, to begin the drying process virtually immediately as the strands are press rolled onto the planar substrate. Alternatively, press rolls 74 and 76 may be heated, or conveyor means 14 may pass through dryer means comprising an oven 82 or the like (see FIGS. 1A and 1B) which heats the adhesive coating for further drying same. Oven 82 may be gas fired or otherwise heated. Of course, the adhesive coating may be air dryed or the like in accordance with this invention, in which case, the panel substrates could be merely stacked one on top another, with strands on given surfaces thereof separating adjacent substrates to permit air drying.

Also situated downstream from nip roll 38 in accordance with the present invention may be any of a variety of cutter means 84 for cutting, slitting or the like, strands 86 which extend over the separation between adjacent panel substrates supported on conveyor means 14. Such cutter means for trimming excess strand material extending beyond the planar surfaces 22 are generally well known to those of ordinary skill in the art, and details of same are not required for adequate understanding of the present invention; hence, only a representative cutting device 84 is illustrated in the present figures (see FIG. 1B).

The foregoing discussion explains in detail both method and apparatus for applying continuous strand material to planar substrates, in accordance with the present invention, resulting in the production of a construction panel 88 having a prefinished surface comprising a plurality of continuous strands, such as textile yarns, in accordance with this invention.

Figure 3:
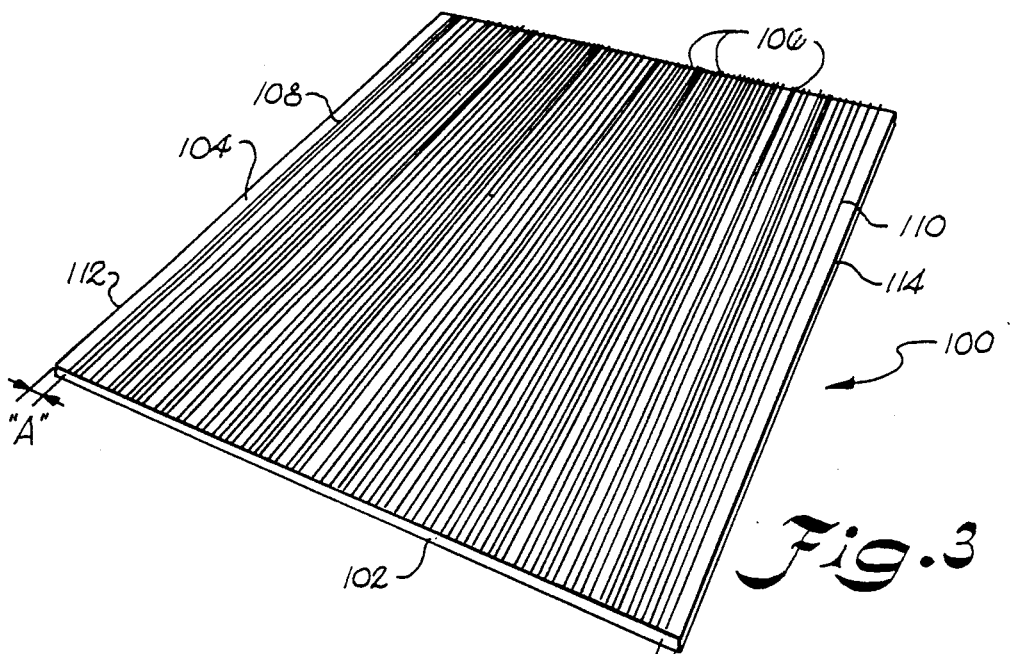
FIG. 3 illustrates in perspective view an exemplary construction panel provided in accordance with the present invention.

Present FIG. 3 provides a further, perspective view of such a construction panel 100, in accordance with this invention. Such construction panel includes a planar substrate 102, which is preferably generally rectangular in shape. Such substrate may comprise either a rigid material (such as fiber wallboard, plywood, panelling, or the like), or a non-rigid material, such as polyester, non-woven batt. Of course, for such "non-rigid" material, the resiliency thereof may be varied to provide a suitable construction panel for particular needs. Thus, the concept of rigidity is relative, as used in the present context. Regardless of the rigidity of substrate 102, such substrate preferably has at least one planar support surface 104 (corresponding to surface 22 as discussed above) upon which a plurality of respective continuous strands 106 are secured in a predetermined lateral separation pattern.

As illustrated, strands 106 (preferably textile yarns of selected type and color) are situated in generally parallel relationship on planar support surface 104. Moreover, the predetermined lateral spacing among such yarns, as established with comb means (as discussed above), forms a selected, decorative pattern on such planar support surface, so as to define a prefinished face surface of construction panel 100. Regardless of the decorative pattern so formed, respective marginal edge yarns 108 and 110 are laterally spaced a predetermined distance "A" from the respective marginal edges 112 and 114 of planar support surface 104, so as to form a predetermined marginal gap in yarn coverage on surface 104 along such respective edges. Such gaps are adapted for use with a predetermined width seaming tape, as discussed below, for hiding seams between adjacent construction panels in a prefinished wall of such panels.

Another aspect of construction panel 100 is that the adhesive layer supported on planar surface 104 releasably supports textile yarns 106 thereon, so that selected ones of such yarns may be stripped from surface 104. The importance of such stripability is that particular yarns may be removed from the prefinished surface to permit cuts to be made in substrate 102 in the areas exposed by such removal. Thus, prefinished panel 100 is adapted for use in construction settings, even where partial panels are required, as frequently occurs during the course of a construction project.

Figure 4:
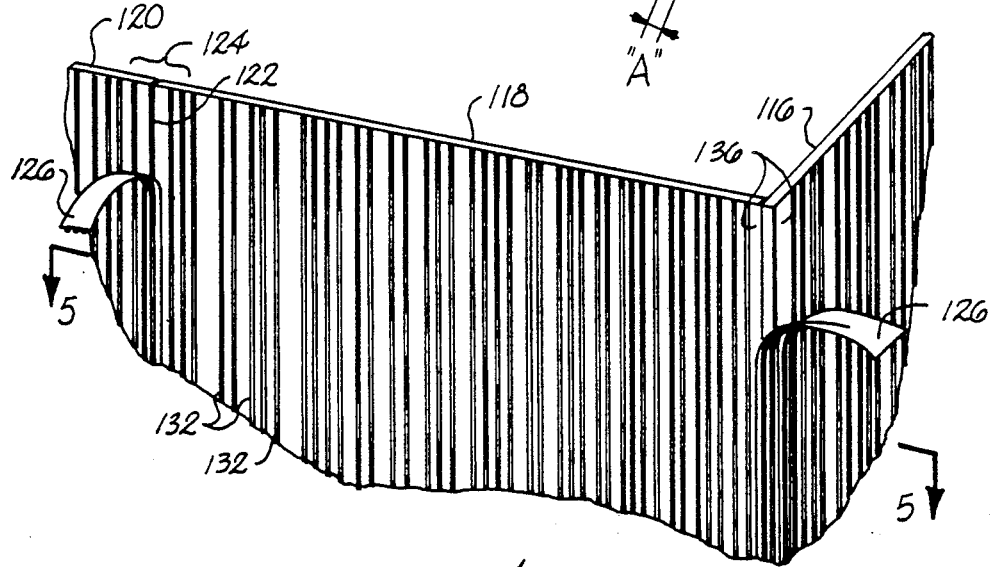
FIG. 4 illustrates in perspective view a plurality of partial construction panels in accordance with this invention, joined with seaming tape in accordance with this invention.
Figure 5:
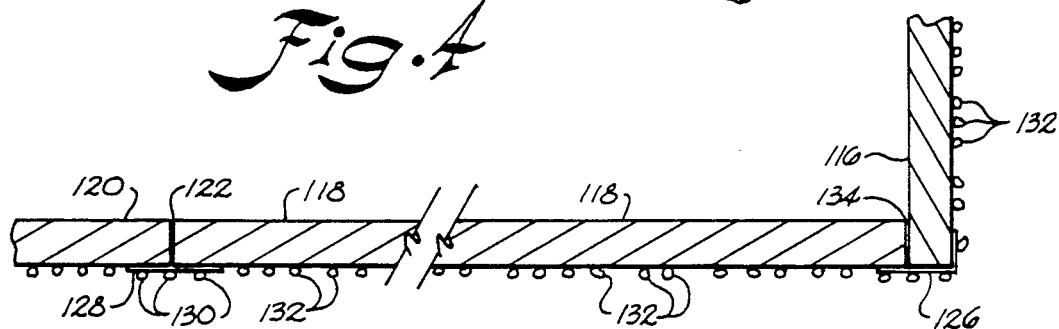
FIG. 5 illustrates a cross-sectional view of the construction panels and seaming tape of FIG. 4, as indicated in line 5—5 illustrated therein.
Figure 6:
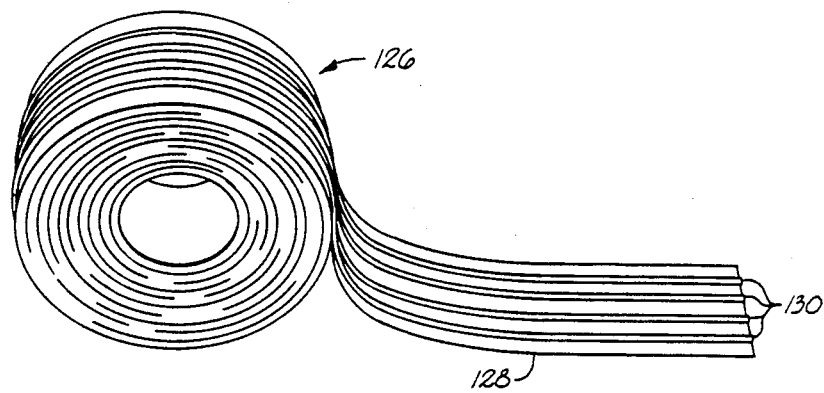
FIG. 6 illustrates a perspective view of a roll of seaming tape in accordance with one aspect of the present invention.

FIGS. 4-6 further illustrate advantages of the present invention which are realized when utilizing construction panels (such as panel 100) furnished in accordance with the present invention. FIG. 4 illustrates a partial, perspective view of a plurality of panels in accordance with this invention erected so as to form part of a prefinished wall. FIG. 5 illustrates a cross-section of the FIG. 4 illustration, as indicated by line 5—5 therein.

A corner is formed between panels 116 and 118. Another panel 120 is situated in co-planar relationship with panel 118. Seam 122 between panels 120 and 118 have yarn gaps of "A" width on either side thereof, as discussed above. Such gaps collectively provide an area 124 adapted for receipt of seaming tape 126 in accordance with this invention. A roll of such tape is illustrated in present FIG. 6, and generally comprises a flexible, self-adhesive backing 128 with a plurality of strands 130 supported thereon. Such strands 130 are generally compatible with the strands 132 otherwise supported on the planar surfaces of panels 116, 118, and 120. Therefore, application of seaming tape 126 across seam 122 hides such seam 122 while visually blending in with strands or yarns otherwise supported on the panel planar surfaces. Thus, a highly effective system is provided for rendering aesthetically pleasing a prefinished wall in accordance with this invention.

The corner fitting between panels 116 and 118 may likewise have the seam 134 therebetween covered with tape 126 (as illustrated in FIGS. 4 and 5). Alternatively, a corner molding, generally comprising a rigid, right-angle member, may be covered with seaming tape and/or laminated yarns in accordance with this invention, and then placed over the yarn gaps 136 on the planar surfaces of panels 116 and 118. Such yarn gaps 136 may comprise the predetermined marginal edging gaps described above, or, if required due to circumstances, may be formed by the stripping of selected strands, as discussed above.

Of course, seaming tape may be provided in various colors, and with particular colors and types of yarns laminated thereto (generally in accordance with this invention), for matching similarly colored prefinished panels. Alternatively, the entirety of the panels and seaming tape all in place on a constructed wall, may be painted at the same time, such as with spray paint or spray lacquer. Such a finishing coat may be variously cut 50-75% (cut lacquer with alkyde oil, and cut paint with mineral spirits) to prevent the respective strands or textile yarns from matting.

Not only may such a finishing layer be applied to a wall once constructed, but such a finishing layer may also be incorporated into the later stages of a production line such as line 12 in present FIG. 1. Although not illustrated, a variety of automatic lacquer or paint sprayers generally available to those of ordinary skill in the art may be utilized for such purposes, and hence need not be discussed herewith in detail for an adequate understanding of this invention.

As a further aspect of this invention, a primer coat may be applied to given planar surfaces of the panel substrates, prior to application of the adhesive coating thereto. Such a primer coat, preferably of paint, may be applied as a preliminary step in a production line, or may be applied to boards prior to their insertion into such a production line. In either event, provision of such a primer coat prevents loss of any aesthetic appeal of the finished product in the event certain strands thereof are stripped from the prefinished surface for purposes of cutting the board, or otherwise. Moreover, such primer coat of paint advantageously absorbs additional paint or lacquer (such as from a finishing coat) at a differential rate from that of strands or textile yarns supported on its surface. Thus, application of a onepass finishing coat to a panel with yarns applied thereto results in a two-tone visual affect, since the yarn generally absorbs paint or lacquer faster (and hence becomes darker) than the planar surface with the base coat of paint thereon.

Alternative inclusion or exclusion of such primer coat and/or finishing coat steps are included aspects of this invention, as are all other variations and modifications for altering construction panels in accordance with this invention.

Since the present invention is useful for providing construction panels, one general rectangular size of such panels preferably produced with this invention is four feet by eight feet. For example, the width of conveyor belt 78 is preferably about 48 inches, for matching the width of rectangular substrate 16 conveyed therealong. Such substrates may be of various lengths, preferably such as about 8 feet long. Operational speed of conveyor means 14 may be varied, and generally depends on the drying temperatures and drying rates of a particular adhesive coating utilized, and/or other physical constraints of the apparatus, and the strands 30 used therewith. With all such variations taken into account, the operational speed of conveyor means 14 may be varied to suit the needs of a particular embodiment thereof, and go up to speeds of generally about 32 feet per minute. Further variations in speed may be dictated by particular features selected for use by those of ordinary skill in the art in connection with particular applications of this invention.

Figure 7:
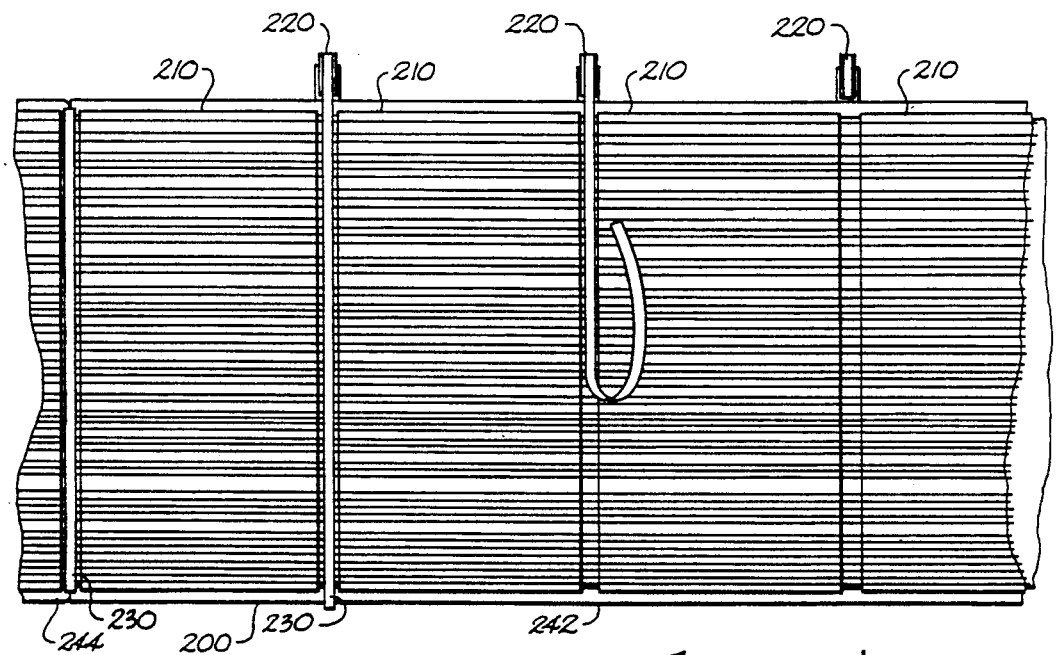
FIG. 7 illustrates further aspects of an alternative production line in accordance with the present invention, particularly including the application of tape across yarns extending between separated panel substrates being produced in accordance with this invention.

Moreover, production line 12 of present FIG. 1 illustrates the conveyance of rectangular substrates (having a longer length than width) generally in a lengthwise orientation. Such orientation results in a construction panel (when used in a wall so as to have its longer length upright) having a prefinished surface with generally vertically oriented continuous strands thereon. This invention may be adapted for providing construction panels having threads oriented in a generally horizontal position on their respective planar surfaces. For example, present FIG. 7 illustrates a modified version of the present invention, wherein (still using 4 feet by 8 feet rectangular planar substrates) the conveyor belt 200 has been widened so as to generally match the length (preferably about 8 feet) of substrates 210. Such substrates have a plurality of respective continuous strands applied thereto in a manner in accordance with this invention generally described above. However, since free ends of such respective strands resulting from cutting thereof (such as with cutter means 84 of present FIG. 1B) are disposed at lateral edges of the panel instead of top and bottom edges thereof, alternative features must be practiced for handling such free ends.

In this instance, tape means 220 provide tape 230 which may be placed across strands extending between the separation between the panels on conveyor belt 200. Preferably, such boards are spaced about 3 inches apart, so that cutting thereof will leave about 1½ inches of respective free ends which may be manipulated to an opposing planar side of the panel substrates which connect thereto. In general, the direction of travel of conveyor 200 as illustrated in FIG. 7 is from right to left, as represented by arrow 240. Thus, as panels consecutively progress through this area of a production line, generally downstream from dryer means thereof, tape 230 is first applied across the respectively extending strands, such as at station 242, and ultimately trimmed to approximately the length of such panel substrates, as at station 244.

Figure 8:
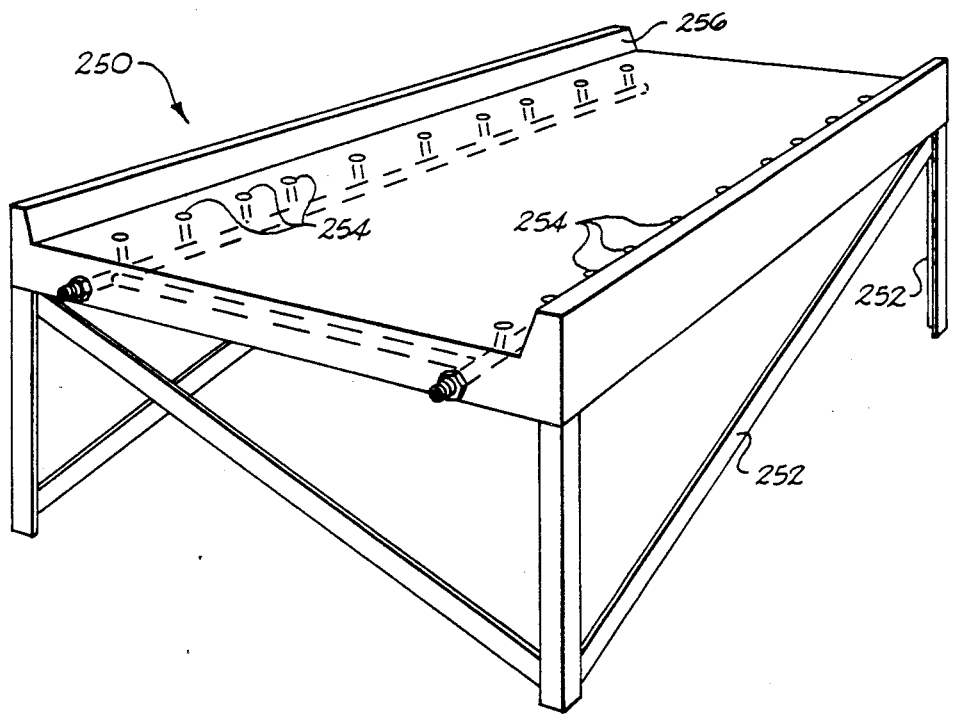
FIG. 8 illustrates blower apparatus in accordance with this invention for securing free ends of respective continuous strands in accordance with this invention, as further discussed below.

In accordance with this invention, virtually any type of manipulation may thereafter occur so as to manipulate the commonly joined strand ends to the opposite side of the planar substrate from the given planar surface thereof on which the strands themselves are secured. To facilitate rapid and efficient manipulation in such fashion, a structure as represented by present FIG. 8 is provided for blower means which manipulates the joined free ends in a manner described above.

In general, blower means 250 comprises support structure 252 for supporting a plurality of jets 254, which when commonly activated, may direct a stream of air at the corresponding marginal edges of a planar substrate directed into area 256 thereof. Such reception area is approximately the same dimensions as the panel substrate itself (i.e., preferably about 4 feet by 8 feet) for receiving such substrate as represented in present FIG. 9.

Figure 9:
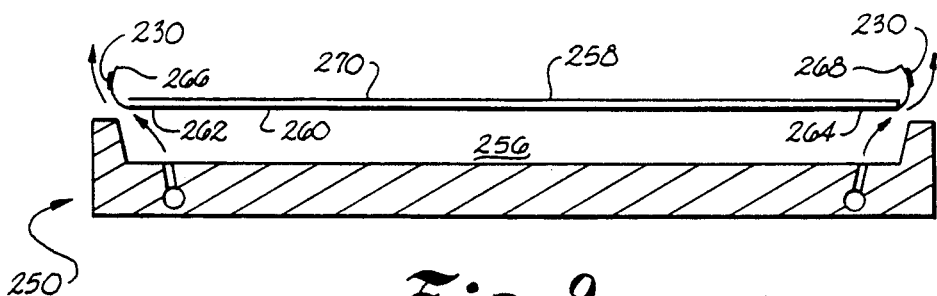
FIG. 9 illustrates a lateral cross-section of a portion of the apparatus of present FIG. 8, in operative association with a construction panel, further in accordance with methodology of the present invention.
Figures 10, 11:
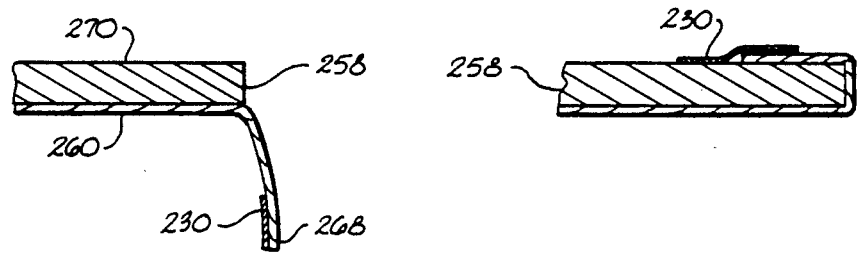
FIGS. 10 and 11 illustrate successive views of marginal edge portions (illustrated in crosssection) of a construction panel and respective strand free ends being secured thereto, in accordance with this invention.

As so illustrated in FIG. 9, as a given panel substrate 258 is lowered into reception area 256 of blower means 250, air is directed towards given planar surface 260 of such substrate, having strands secured thereto. Moreover, such air is more particularly directed at the marginal edges 262 and 264 on each respective lateral side thereof which causes the respective joined ends 266 and 268 (joined by their corresponding tapes 230) to be forced upward and away from surface 260 towards a surface 270 of substrate 258 which is opposite surface 260. As illustrated in greater detail in FIGS. 10–11, once the joined free ends 268 are manipulated to the reverse side 270 of substrate 258, tape 230 may be used to secure such free ends from the view of prefinished side 260. Such construction panels may be utilized for new construction or renovation, as generally discussed above.

In general, construction panels in accordance with this invention may be used in new construction, or applied over existing walls during the course of renovation, by gluing or nailing, or otherwise securing present construction panels to either such pre-existing walls, or new frame structure. Particularly if the construction panels are nailed up, paneling or other small-headed nails which are precolored for matching color of the prefinished panels may be used for virtually completely hiding the nail-up procedure.

While various examples of the present invention have been described above in particular detail, all such description is by way of example only. It is to be understood that those of ordinary skill in the art will recognize and be able to practice numerous modifications and variations to the present invention, without departing from the spirit and scope thereof. For example, construction panels having prefinished surfaces of completely different aesthetic appearances and appeal may be provided by varying the predetermined yarn lateral spacing patterns in accordance with this invention (either in fixed steps, randomly, continuously, or in any other fashion), and by varying the number, type, and size of strands or textile yarns utilized, as well as the colors thereof. All such variations, and any others which may be practiced by those of ordinary skill in the art, fall within the scope of this invention, which is further defined by the appended claims.

What is claimed is:

1. A process for laminating a given substrate with textile yarn to provide decorative, prefinished panels, including:

providing a conveyor for advancing generally planar panels in a given direction along an axis of said conveyor, with a given side of said panels facing generally upward, said panels comprising generally rectangular, rigid members having a longer length than width, with said panels being advanced widthwise along said conveyor, and with a generally predetermined amount of separation between adjacent said panels on said conveyor;

providing a rotatable nip roll, with a rotation axis thereof generally perpendicular to the conveyor axis, with an outside diameter thereof relatively adjacent said panel given sides as they are advanced by said conveyor past the nip roll;

providing a yarn guiding comb situated generally above said conveyor, and upstream from the said nip roll;

coating with adhesive the given side of panels advanced by said conveyor, in an area generally upstream from said nip roll;

drawing a plurality of yarn ends through said yarn guiding comb and underneath said nip roll, while advancing panels therebeneath with said conveyor, so that said nip roll pressures said yarn into contact with said adhesive coating for adherence of the yarn to the panel given sides;

drying said adhesive coating in an area generally downstream from said nip roll, so as to generally secure said yarns to said panel sides;

securing tape across yarn extending across the separation between adjacent panels;

cutting said extending yarn so as to form free yarn ends collectively joined with said tape;

manipulating said free ends so as to wrap said free ends around respective panel marginal edges; and securing said free ends with said tape to panel sides which are received to said given sides thereof, whereby said free ends are both secured and hidden from said panel given sides.

2. A process as in claim 1, wherein said manipulating includes directing a flow of air at each panel given side along the respective marginal edges thereof for pushing said free ends backwards from said given side so as to be wrapped around said panel marginal edges.

3. A method of constructing a wall from prefinished planar substrates, said method comprising:

prefinishing said substrates, said step comprising:

conveying a planar substrate in a given direction along a predetermined pathway, with a given planar surface of said substrate presented in a pathway application area for application of strand material thereto;

providing a plurality of continuous strands to be respectively applied to said given planar surface in said pathway application area;

applying an adhesive coating to said given planar surface before conveying said planar surface through said pathway application area, permitting individual strands to subsequently be selectively stripped from said planar surface to facilitate use of said planar substrate in constructing prefinished walls, by accommodating cuts in said substrate along where said stripped strand is removed;

continuously drawing said strands across said given planar surface as said surface passes through said pathway application area, so as to contact said strands with said adhesive coating of said surface while applying pressure thereto;

drying said adhesive coating so as to secure said strands to said planar surface; and trimming excess strand material extending beyond said planar surface;

whereby said planar substrate is provided with decorative strand material for use in construction of prefinished walls;

stripping individual strands from at least one of said planar substrates;

cutting said at least one substrate where said individual strands have been stripped therefrom;

positioning said at least one substrate adjacent another substrate; and applying a seaming tape which incorporates respective strands therealong to the adjacent surfaces of said substrates for visually blending with the strands secured to said planar surfaces of said substrates.

4. A method of constructing a wall from prefinished planar substrates, said method comprising:

prefinishing said substrates, said step comprising:

conveying a planar substrate in a given direction along a predetermined pathway, with a given planar surface of said substrate presented in a pathway application area for application of strand material thereto;

providing a plurality of continuous strands to be respectively applied to said given planar surface in said pathway application area;

applying an adhesive coating to said given planar surface before conveying said planar surface through said pathway application area;

continuously drawing said strands across said given planar surface as said surfaces passes through said pathway application area, so as to contact said strands with said adhesive coating of said surface while applying pressure thereto, and guiding respective marginal edge strands for contact of said marginal edge strands a predetermined distance from respective marginal edges of said planar surface so as to establish a predetermined marginal edge space therealong said edges in which no strands are secured, whereby seams along contiguous marginal edges of adjacent planar substrates situated in a prefinished wall may be covered with seaming tape which incorporates respective substrates therealong for visually blending with strands secured to said planar surfaces;

drying said adhesive coating so as to secure said strands to said planar surface; and trimming excess strand material extending beyond said planar surface;

whereby said planar substrate is provided with decorative strand material for use in construction of prefinished walls;

positioning at least two of said planar substrates adjacent each other; and applying said seaming tape to seams along contiguous marginal edges of said adjacent planar substrates, thereby visually blending said strands secured to said planar surfaces of said substrates.

* * * * *

UNITED STATES PATENT AND TRADEMARK OFFICE
CERTIFICATE OF CORRECTION

PATENT NO. : 5,000,808

DATED : March 19, 1991

INVENTOR(S) : George L. Deviney

It is certified that error appears in the above-identified patent and that said Letters Patent is hereby corrected as shown below:

Column 13, line 26, Claim 1, change "received" to --reversed--.

Signed and Sealed this

Eighteenth Day of August, 1992

*Attest:*

DOUGLAS B. COMER

*Attesting Officer*      *Acting Commissioner of Patents and Trademarks*